Nov. 23, 1937.  E. W. CURTIS  2,099,678
RIVET
Filed June 29, 1936
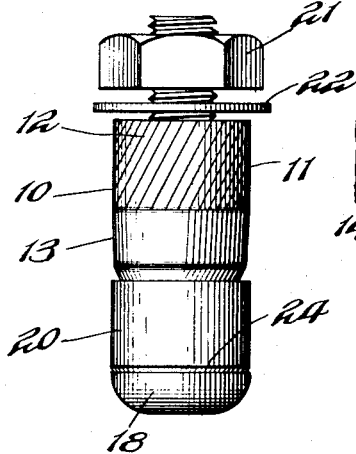
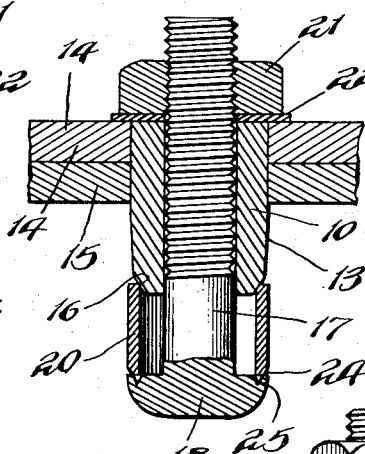
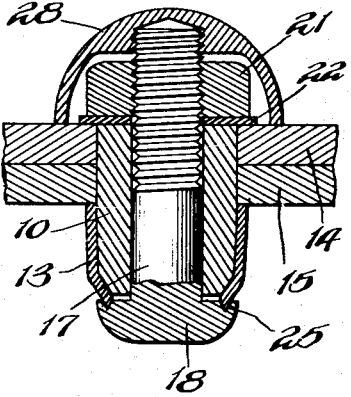
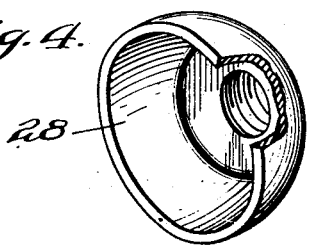
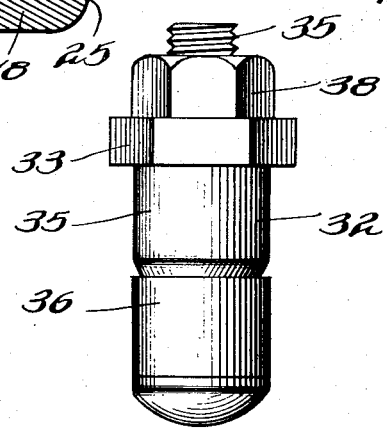
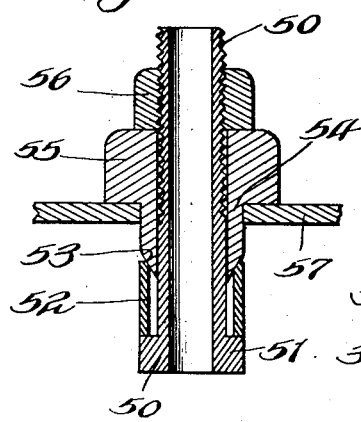
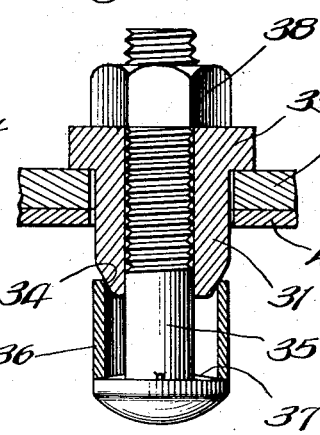
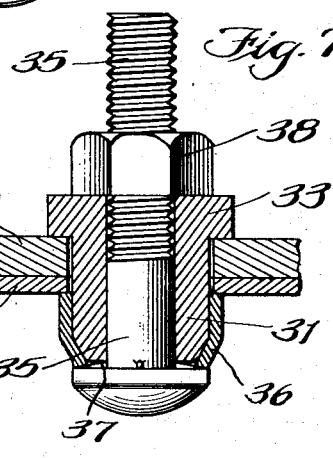
INVENTOR.
Eugene W. Curtis
BY Kent W. Worrell
ATTORNEY.

Patented Nov. 23, 1937

2,099,678

UNITED STATES PATENT OFFICE 2,099,678

RIVET

Eugene W. Curtis, Chicago, Ill.

Application June 29, 1936, Serial No. 87,822

10 Claims. (Cl. 138—98)

This invention relates to rivets in general, and more particularly to that form of composite rivets, for plugging and sealing holes, which are adapted to be inserted and secured in place from one side of the wall of a structure, an example being shown in my prior Patent No. 2,021,176, dated November 19, 1935.

The principal object of my present invention is to provide a composite rivet or plug of this general character in which the plugging of the hole through which the rivet or plug is passed is effected by the employment of a hard metal tubular element or sleeve in association with an expansible ferrule or collar, and means, as a bolt, for expanding the ferrule or collar in securing the composite rivet in place, in contradistinction to the use of a malleable tubular element or sleeve as described in my prior patent referred to, whereby a more effective composite rivet or sealing plug is provided for a greater field of application in plugging holes and applying patches to cylinders and other structures where access to the inner side of the wall of the cylinder in applying a rivet is impossible or impracticable.

A further object of my invention is to provide a composite rivet or sealing plug which may serve also as a nipple for communication with the cylinder or other container to which the device is applicable.

With these principal objects in view my invention contemplates a peculiar construction of the essential or main parts of the composite rivet or sealing plug, and includes certain details of construction, as hereinafter described and particularly set forth in the appended claims.

In the accompanying drawing illustrating preferred embodiments of the invention, Fig. 1 is a side elevation of a composite sealing rivet assembly in accordance with this invention;

Fig. 2 is a sectional view illustrating the composite rivet applied to a hole in a pair of plates, before the composite rivet is drawn up for sealing the hole;

Fig. 3 is a sectional view showing the composite rivet drawn up, including a cap attached to the outer end;

Fig. 4 is a perspective of the cap;

Fig. 5 is an elevation of a modified form of my invention in which the sleeve of the composite rivet includes an engaging flange as a part thereof;

Fig. 6 is a sectional view prior to the tightening application of the assembly shown in Fig. 5;

Fig. 7 is a sectional view thereof, after the composite rivet is drawn up; and

Fig. 8 is a sectional view of a further modification of the composite rivet before it is drawn up, in this instance to provide a nipple connection for a tank or the like.

Sealing rivets of this type are used in a variety of ways, that is, to fasten two or more plates together for attaching plates to structures which are accessible only from one side such as the exterior of a tank; for plugging holes in a like situation either by the application of an individual rivet to a small hole or by means of a plate to a large hole thus requiring a number of rivets; and for applying hollow rivets to a structure which is accessible from one side only and thus providing a pipe tap for liquids and gases. In each of these cases it is desirable, if not always necessary, to provide a sealed, fluid-tight and gas-tight fastening which is firmly and securely attached.

Referring now more particularly to Figures 1 to 4, this composite rivet comprises a hard metal sleeve 10 having a straight cylindrical portion 11, which may be provided in its outer face with straight or slightly spiral knurls 12, and with a slightly tapered outer surface 13 extending from the knurled surface to provide a driving and attaching fit when the rivet is inserted through a single wall, or through a pair of plates, as 14 and 15, to be joined by the rivet, the inner end of the sleeve having a sharply tapered surface 16.

Extending through the sleeve 10 is an expanding core or bolt 17 having a head 18 of substantially the same outer diameter as the sleeve 10, so that these parts may be inserted through a hole to which the composite rivet is to be applied, with the threaded portion of the bolt extending freely through the plain bore of the sleeve. To complete the assembly constituting the composite rivet there is interposed between the inner side of the bolt head 18 and the inner end of the sleeve 10 a sealing collar 20, of expansible metal, which rests upon the inclined or tapered surface 16 at the inner end of the sleeve, the outer diameter of said collar being such that the outer surface thereof does not project beyond the outer surface of the sleeve for the insertion of the assembly through a hole, as shown in Fig. 2. To make a proper sealing joint the collar should be of a length slightly greater than that portion of the sleeve which projects inwardly beyond the inner surface of the inside member to which the rivet is applied, whereby when the collar is expanded over the body of the sleeve by the bolt head it will limit the drawing up movement, at which time the collar is also compressed between the bolt head and inner surface of the wall or plate, to complete the seal, as shown in Fig. 3.

For the purpose of compressing the collar and securing the parts of the rivet together, I prefer to employ a nut 21 at the outer end of the rivet, and between this nut and the end of the sleeve 19, to slightly overlap the end of the latter, is a metal washer 22 of copper, brass or other sealing material.

If desired the end of the sealing collar 20, which is in contact with the head 18 of the bolt, may have a slight bevel 24 at its outer edge to be seated in a circular ring or groove 25 at the under side of the head of the bolt, the groove being preferably V-shaped in cross section.

When this composite rivet is applied to a hole for plugging it, or to a hole through a pair of members 14 and 15 (Fig. 2) for securing them together as well as plugging the hole, the nut is drawn up tightly, forcing the sealing collar 20 against the tapered surface 16 of the sleeve which slightly expands the collar causing it to follow closely along the outer surface of the body of the sleeve until the edge of the collar away from the head of the bolt engages the inner surface of the structure to which the rivet is applied, as shown in Fig. 3. At this time the sealing collar 20, preferably of annealed metal, will tightly engage the inside of the structure to which it is applied forming a seal at this point and also a seal at the point where it engages the under side of the bolt head 18, so that there is no possibility of leakage at the inner portion of the composite rivet or through the hole into which the rivet is inserted.

When the parts of the composite rivet are drawn up tightly in this manner the threaded end of the bolt projects a considerable distance beyond the outside of the structure and this projecting portion may be cut off close to the outer surface of the nut 21, or it may be cut off a short distance from the nut, leaving a threaded portion to which an enclosing cap nut 28 may be applied which extends either to the surface of the nut 21 or over the nut and washer to provide a neat and finished appearance, as shown in Fig. 3, but it will be understood this cap has no sealing function as the opening through which the rivet is inserted is sealed on the inside by the collar coacting with the sleeve, both head, and inner face of the wall or plate, augmented to some extent by the washer 22. Thus a double seal is provided by the rivet which is very effective for tanks containing liquids and gases. This type rivet with the knurled sleeve is intended to provide a driving fit so that the sleeve may be passed quickly but firmly through the opening to which the rivet is applied, being quickly drawn up by rotating the nut 21 and the projecting end of the bolt snipped or cut off at the proper length. The cap 28 may then be applied if desired.

In the form of the invention shown by Figs. 5 to 7, a sleeve member 31 has a straight cylindrical portion 32 enlarged at its outer end in the form of a flange or nut 33, and at its inner end is tapered abruptly, as at 34, for expanding a collar, 36, as in the other form of composite rivet heretofore described. A bolt 35 is inserted loosely through this sleeve and in this instance also the collar is interposed between the head of the bolt and tapered surface 34 of the sleeve. At the inner side of the head of the bolt I may provide spaced ribs 37 extending outwardly from the stem and engaging the outer ends of the sleeve and collar to assist in preventing relative rotation of the bolt. In this instance also compression of the collar is effected by a nut 38 applied to the threaded projecting end of the bolt, and when the composite rivet is inserted in a single hole, or holes through adjacent members 40 and 41, the sleeve need not fit the hole or holes tightly in order to provide a sealing fit when the rivet is drawn up.

In drawing up a composite rivet in accordance with my invention a holding tool, such as a flat wrench, is applied to the external head 33 and the nut 38 is rotated upon the bolt 35. This presses the sealing collar 36 against the tapered surface 34 which spreads or expands said collar against the outside of the body portion of the sleeve 31 until it engages the surface of the inner face of the member to which the rivet is applied. This forms a seal between the bolt head and said inner member, as before explained, and holds the rivet tightly in the hole through which it is inserted. The outer end of the bolt may then be cut off and a cap or cover as shown in Fig. 4 may be applied.

In practice, when a large number of these composite rivets are to be applied, a special tool may be provided for rapidly spinning the nut, as 21, on the bolt, but if the rivets are of the type shown in Figs. 5 to 7 the tool (not shown) may have a socket for holding the nut 33 on the sleeve as well as means for turning the compressing nut 38.

When it is desired to make a tubular connection to a tank or other structure the form of my invention shown in Fig. 8 is employed, in which a hollow bolt 50 is provided, said bolt also having a head 51 for engaging a sealing collar 52 to press it against a tapered surface 53 on a sleeve member 54 having an external flange or head 55, as well as a compressing and fastening nut 56 on the threaded end of the hollow bolt for drawing it outwardly to expand the collar 52 over the body portion of the sleeve in sealing position against the inside of a wall or plate 57 to which the rivet is applied. Any sort of a pipe fitting may then be applied to the outer threaded end of the hollow rivet and a convenient connection is thus provided for a fluid or liquid tap which may easily be applied by a single workman from the outside of a tank or casing. This is especially valuable for making fluid-tight tapped openings in gas or oil tanks and the like.

In all of these form the composite rivets are easily inserted and applied from one side only of a wall or structure, the rivet is quickly drawn up by means of a nut on a threaded bolt, and a seal is afforded by compressing a sealing collar against an expanding surface, which makes a seal between the head of the bolt and the inside surface to which the rivet is applied, and the sleeve member is held in place during the application of the sealing collar either by a tight fit in the structure to which the rivet is applied or by an external head which is held against rotation while the nut is being drawn up upon the threaded portion of the bolt.

Where in the drawing and specification I have shown and described a bolt as the element for forcing the sealing collar over the projecting portion of the sleeve and compressing it between the head of the bolt and face of the wall to which the rivet is to be secured, in connection with a nut for drawing on the bolt, it will be obvious that this element may be modified, or the bolt reversed with respect to the sleeve and collar, within the spirit and scope of the claims.

I claim:

1. A composite rivet assembly for use in patching the walls of boilers and like structures, comprising a hard metal sleeve adapted to pass through a rivet hole in the wall and project beyond the inner face of the wall, said sleeve being tapered at its inner end, a longitudinally movable element or bolt extending through the sleeve and having a head beyond the tapered inner end of said sleeve, and an expansible metal collar of slightly greater length than the projecting portion of the sleeve, interposed between the head of the longitudinally movable element and tapered end of the sleeve to form a seal between said head and the wall to which the rivet is applied when the expansible element is compressed over the projecting portion of the sleeve by longitudinal movement of the bolt in securing the rivet in place.

2. A composite rivet assembly for use in patching the walls of boilers and like structures, comprising a hard metal sleeve adapted to pass through a rivet hole in the wall and project beyond the inner face of the wall, said sleeve being tapered at its inner end; a longitudinally movable element extending through the sleeve and having a head beyond the tapered inner end of said sleeve; an expansible metal collar of slightly greater length than the projecting portion of the sleeve and of approximately the same external diameter to pass through the rivet hole ahead of the sleeve, said collar being interposed between the head of the longitudinally movable element and tapered end of the sleeve to form a seal between said head and the wall to which the rivet is applied when the expansible element is compressed over the projecting portion of the sleeve by action of the longitudinally movable element in securing the rivet in place, and means for drawing on the longitudinally movable element to force the collar over the sleeve and compress it between the rivet head and wall.

3. A composite rivet assembly for use in patching the walls of boilers and like structures, comprising a hard metal sleeve having means for engaging the wall of a rivet hole to prevent turning of said sleeve therein, the inner end of the sleeve being tapered; a longitudinally movable element extending through the sleeve and having a head beyond the tapered inner end of said sleeve; an expansible metal collar of slightly greater length than the projecting portion of the sleeve and of approximately the same external diameter to pass through the rivet hole ahead of the sleeve, said collar being interposed between the head of the longitudinally movable element and tapered end of the sleeve to form a seal between said head and the wall to which the rivet is applied when the expansible element is compressed over the projecting portion of the sleeve by action of the longitudinally movable element in securing the rivet in place, and means for drawing on the longitudinally movable element to force the collar over the sleeve and compress it between the rivet head and wall.

4. A composite rivet assembly for use in patching the walls of boilers and like structures, comprising a hard metal sleeve adapted to pass through a rivet hole in the wall and project beyond the inner face of the wall, said sleeve being tapered at its inner end and having a portion thereof extending beyond the outer face of the wall to provide for holding the sleeve against turning; a longitudinally movable element extending through the sleeve and having a head beyond the tapered inner end of said sleeve; an expansible metal collar of slightly greater length than the projecting portion of the sleeve and of approximately the same external diameter to pass through the rivet hole ahead of the sleeve, said collar being interposed between the head of the longitudinally movable element and tapered end of the sleeve to form a seal between said head and the wall to which the rivet is applied when the expansible element is compressed over the projecting portion of the sleeve by action of the longitudinally movable element in securing the rivet in place, and means for drawing on the longitudinally movable element to force the collar over the sleeve and compress it between the rivet head and wall.

5. A composite rivet assembly for use in patching the walls of boilers and like structures, comprising a hard metal sleeve adapted to pass through a rivet hole in the wall and project beyond the inner face of the wall, said sleeve being tapered at its inner end and having an enlarged portion at its outer end squared to receive a wrench for holding the sleeve against turning; a longitudinally movable element extending through the sleeve and having a head beyond the tapered inner end of said sleeve; an expansible metal collar of slightly greater length than the projecting portion of the sleeve and of approximately the same external diameter to pass through the rivet hole ahead of the sleeve, said collar being interposed between the head of the longitudinally movable element and tapered end of the sleeve to form a seal between said head and the wall to which the rivet is applied when the expansible element is compressed over the projecting portion of the sleeve by action of the longitudinally movable element in securing the rivet in place, and means for drawing on the longitudinally movable element to force the collar over the sleeve and compress it between the rivet head and wall.

6. A composite rivet assembly for use in patching the walls of boilers and like structures, comprising a hard metal sleeve adapted to pass through a rivet hole in the wall and project beyond the inner face of the wall, said sleeve being tapered at its inner end; a bolt extending through the sleeve and having its head spaced from the inner end thereof; an expansible collar of slightly greater length than the projecting portion of the sleeve and of approximately the same external diameter to pass through the rivet hole ahead of the sleeve, said collar being interposed between the head of the bolt and tapered end of the sleeve; and a nut threaded on the bolt for drawing on the same to force the collar over the sleeve and compress it between the rivet head and wall.

7. A composite rivet assembly for use in patching the walls of boilers and like structures, comprising a hard metal sleeve adapted to pass through a rivet hole in the wall and project beyond the inner face of the wall, said sleeve being tapered at its inner end; a bolt extending through the sleeve and having its head spaced from the inner end thereof, an annular groove at the inner side of the head of the bolt; an expansible collar of slightly greater length than the projecting portion of the sleeve and of approximately the same external diameter to pass through the rivet hole ahead of the sleeve, said collar being seated at one end in the aforementioned groove in the head of the bolt and engaging the tapered end of the sleeve at its outer end; and a nut threaded on the bolt for drawing on the same to force the expansible collar over the sleeve and compress it between the rivet head and wall.

8. A composite rivet assembly for use in patching the walls of boilers and like structures, comprising a hard metal sleeve adapted to pass through a rivet hole in the wall and project beyond the inner face of the wall, said sleeve being tapered at its inner end; a bolt extending through the sleeve and having its head spaced from the inner end thereof; an expansible collar of slightly greater length than the projecting portion of the sleeve and of approximately the same diameter, to pass through the rivet hole ahead of the sleeve, said collar being interposed between the head of the bolt and tapered end of the sleeve; a washer on the outer end of the bolt to bear against the outer face of the wall; and a nut threaded on the outer end of the bolt against said washer to draw on the bolt to expand the collar over the projecting inner end of the sleeve and compress said collar between the head of the bolt and inner face of the wall to provide a seal.

9. A composite rivet assembly for use in patching the walls of boilers and like structures, comprising a hard metal sleeve adapted to pass through a rivet hole in the wall and project beyond the inner face of the wall, said sleeve being tapered at its inner end, a longitudinally movable element extending through the sleeve and having a head beyond the tapered inner end of the sleeve, said longitudinally movable element having a bore extending through the same to form a pipe connection to the structure, and an expansible metal collar of slightly greater length than the projecting portion of the sleeve and of approximately the same external diameter to pass through the hole ahead of the sleeve, said collar being interposed between the head of the longitudinally movable element and tapered end of the sleeve to form a seal between said head and the wall to which the rivet is applied when the expansible collar is forced over the projecting portion of the sleeve and compressed between the aforementioned head and inner face of the wall.

10. A composite rivet assembly for use in patching the walls of boilers and like structures, comprising a hard metal sleeve adapted to pass through a rivet hole in the wall and project beyond the inner face of the wall, said sleeve being tapered at its inner end; a bolt extending through the sleeve and having its head spaced from the inner tapered end of the sleeve, said bolt having a bore extending through the same to form a pipe connection to the structure; an expansible metal collar of slightly greater length than the projecting portion of the sleeve and of approximately the same external diameter to pass through the hole ahead of the sleeve, said collar being interposed between the head of the bolt and tapered end of the sleeve; and a nut on the outer end of the bolt to draw on the same to force the collar over the projecting portion of the sleeve and compress it between the bolt head and inner face of the wall to form a seal.

EUGENE W. CURTIS.